US012799307B2

(12) United States Patent
Bonesso et al.

(10) Patent No.: US 12,799,307 B2
(45) Date of Patent: Nov. 17, 2026

(54) RUBBER COMPOSITION FOR TIRE TREAD

(71) Applicant: The Goodyear Tire & Rubber Company, Akron, OH (US)

(72) Inventors: Vitor Conti Bonesso, Wadsworth, OH (US); Warren James Busch, North Canton, OH (US); Thomas Franklin Spilker, Broadview Heights, OH (US); Ryan Michael Schmidt, Wadsworth, OH (US)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 574 days.

(21) Appl. No.: 18/537,926

(22) Filed: Dec. 13, 2023

(65) Prior Publication Data

US 2024/0199859 A1 Jun. 20, 2024

Related U.S. Application Data

(60) Provisional application No. 63/387,702, filed on Dec. 16, 2022.

(51) Int. Cl.

| | |
|---|---|
| ***C08L 7/00*** | (2006.01) |
| ***B60C 1/00*** | (2006.01) |

(52) U.S. Cl.

CPC .............. *C08L 7/00* (2013.01); *B60C 1/0016* (2013.01); *C08L 2205/03* (2013.01)

(58) Field of Classification Search

CPC ....... C08L 7/00; C08L 2205/03; B60C 1/0016

See application file for complete search history.

(56) References Cited

U.S. PATENT DOCUMENTS

| | | | |
|---|---|---|---|
| 7,001,946 | B2 | 2/2006 | Steiner et al. |
| 8,957,149 | B2 | 2/2015 | Zhao et al. |
| RE47,886 | E | 3/2020 | Mathey et al. |
| 2019/0375901 | A1 | 12/2019 | Xiong et al. |
| 2020/0392314 | A1 | 12/2020 | DeGaudemaris et al. |
| 2021/0023882 | A1 | 1/2021 | Miyazaki |

*Primary Examiner* — Patrick D Niland

(74) *Attorney, Agent, or Firm* — Mandy B. Willis

(57) ABSTRACT

A rubber composition suited for forming a truck tire tread includes 100 phr of elastomers, including 100 phr of elastomers, including at least 50 phr natural rubber, at least 10 phr of butadiene rubber and at least 10 phr styrene-butadiene rubber. The rubber composition further includes at least 45 phr of reinforcing fillers, including carbon black and a high surface area silica. A ratio of the carbon black to the high surface area silica is at least 4:1. The high surface area silica has a CTAB surface area of at least 220 $m^2/g$. The rubber composition further includes one or more processing aids and a sulfur-containing cure package including a vulcanizing agent and an ultra-accelerator.

19 Claims, No Drawings

RUBBER COMPOSITION FOR TIRE TREAD

FIELD

The exemplary embodiment relates to a rubber composition, especially for a tire tread, and more particularly for on-the-road truck tires, the composition having improved abrasion resistance, leading to improved mileage.

BACKGROUND

Rubber compositions suited to use in tires often include a mixture of elastomers, together with reinforcing fillers, such as carbon black and silica. The rubber composition may be formulated to provide specific properties, such as grip on wet surfaces, tear resistance, and the like. Achieving specific properties often involves a tradeoff, since improvements in one property may result in a loss of another. The following references provide examples of different rubber formulations of this type.

U.S. Pat. No. RE47,886, issued Mar. 3, 2020, entitled TIRE WITH IMPROVED GRIP ON WET GROUND, by Mathey, et al., describes a rubber composition for a tire that includes a blend of natural rubber or synthetic polyisoprene, and a styrene-butadiene copolymer at 20 parts per hundred parts of elastomer, phr, or more, a reinforcing filler including carbon black, and optionally, a reinforcing inorganic filler, such as silica, and a hydrocarbon plasticizing resin.

U.S. Pub. No. 20200392314 A1, published Dec. 17, 2020, entitled CIVIL ENGINEERING VEHICLE TIRE, by de Gaudemaris, et al., describes a tread for a vehicle tire including a rubber composition including an elastomer matrix of from 50 to 100 phr of a styrene-butadiene copolymer and from 0 to 50 phr of isoprene elastomer, a reinforcing filler including carbon black and from 1 to 30 phr of hydrocarbon resin containing units derived from aromatic and cycloaliphatic monomers, and a crosslinking system.

U.S. Pub. No. 20210023882 A1, published Jan. 28, 2021, entitled RUBBER COMPOSITION FOR TREAD, AND PNEUMATIC TIRE, by Miyazaki, describes a tread rubber composition containing a modified styrene-butadiene rubber or a modified polybutadiene rubber, silica, and sulfur and/or a sulfur-containing compound. The tread rubber composition is said to be excellent in wet grip performance during the initial phase of running.

U.S. Pat. No. 8,957,149 B2, issued Feb. 17, 2015, entitled PREPARATION AND USE OF SILICA REINFORCED RUBBER COMPOSITION FOR TRUCK TIRE TREAD, by Zhao, et al., describes preparation and use of a silica reinforced rubber composition, which may be used for a truck tire tread expected to be exposed to heavy load duty.

U.S. Pat. No. 7,001,946 B2, issued Feb. 21, 2006, entitled TIRE WITH TREAD OF NATURAL RUBBER-RICH RUBBER COMPOSITION, by Steiner, et al., describes a tire tread of a natural rubber-rich rubber composition reinforced with a combination of rubber reinforcing carbon black and precipitated silica in which carbon black is in the majority of such reinforcement.

U.S. Pub. No. 20190375901 A1, published Dec. 12, 2019, entitled METHODS OF MAKING AN ELASTOMER COMPOSITE REINFORCED WITH SILICA AND PRODUCTS CONTAINING SAME, by Xiong, et al., describes methods of making a silica elastomer composite with a destabilized dispersion of a precipitated silica.

One problem with such formulations is that the mileage of the tires is often compromised in achieving other properties.

Described herein is a rubber composition which provides a tire with good mileage while maintaining other desirable properties.

BRIEF DESCRIPTION

In accordance with one aspect of the exemplary embodiment, a rubber composition includes 100 phr of elastomers, including at least 50 phr natural rubber, at least 10 phr of butadiene rubber, and at least 10 phr styrene-butadiene rubber. The composition includes at least 45 phr of reinforcing fillers, including carbon black and a high surface area silica. A ratio of the carbon black to the high surface area silica is at least 4:1. The high surface area silica has a CTAB surface area of at least 220 $m^2/g$. The composition further includes one or more processing aids and a sulfur-containing cure package, the cure package including a vulcanizing agent and an ultra-accelerator.

The cure package may further include a benzothiazole sulfenamide.

The high surface area silica may have a surface area of at least 240 $m^2/g$ and/or no more than 400 $m^2/g$.

The reinforcing fillers may total at least 50 phr and/or no more than 70 phr. Reinforcing fillers, other than the carbon black and the high surface area silica, may be present at no more than 10 phr.

The at least one processing aid may include at least one of a resin, a wax, and a liquid plasticizer.

The ultra-accelerator may include or consist of 1,6-bis(N,N-dibenzylthiocarbamoyldithio)hexane. The ultra-accelerator may be at least 2 phr.

The rubber composition may further include at least one of an antioxidant and an antidegradant.

The rubber composition may include no more than 30 phr of components other than the elastomers, the carbon black, and the high surface area silica.

A tire tread may be formed from the rubber composition. The tire tread may have a tread depth of 22 to 28 mm.

In accordance with another aspect of the exemplary embodiment, a method of forming a cured rubber composition includes mixing together: 100 phr of elastomers, including at least 50 phr natural rubber, at least 10 phr of butadiene rubber and at least 10 phr styrene-butadiene rubber, at least 45 phr of reinforcing fillers, including carbon black and a high surface area silica, a ratio of the carbon black to the high surface area silica being at least 4:1, the high surface area silica having a CTAB surface area of at least 220 $m^2/g$, one or more processing aids, and a sulfur-containing cure package including a vulcanizing agent and an ultra-accelerator, to form a mixture and curing the mixture to form the cured rubber composition.

The mixture further may further include at least one of an antioxidant and an antidegradant.

The curing may include heating the mixture to a temperature of at least 120° C. The curing may include forming a tire tread comprising the cured rubber composition.

In accordance with another aspect of the exemplary embodiment, a rubber composition includes 100 phr of elastomers, comprising a natural rubber, a butadiene rubber, and a styrene-butadiene rubber; 45-70 phr of a combination of carbon black and a high surface area silica, a ratio of the carbon black to the high surface area silica being at least 4:1, the high surface area silica having a CTAB surface area of at least 240 $m^2/g$; 3.0 to 20.0 phr of processing aids selected from the group consisting of a resin, a wax, a liquid plasticizer, and mixtures thereof; a total of 1-5 phr of at least one of an antioxidant and an antidegradant; and a total of 5-15 phr of a sulfur-containing cure package comprising a sulfur cure agent, one or more fatty acids, a benzothiazole sulfenamide, zinc oxide, and 1,6-bis-(N,N-dibenzylthiocarbamoyldithio)hexane.

DETAILED DESCRIPTION

Aspects of the exemplary embodiment relate to a rubber composition which includes a polybutadiene, a natural rubber, and a styrene-butadiene rubber with a reinforcing filler comprising (or consisting of) carbon black and a high surface area silica, in which a ratio by weight of the carbon black to the silica may be at least 4:1.

The rubber composition is suited to use in a tire, in particular, in a tire tread. Unexpectedly, the rubber composition has a high abrasion resistance, which is particularly advantageous in providing a tread with a long lifetime.

The terms "rubber" and "elastomer," where used herein, may be used interchangeably, unless otherwise indicated. The terms "rubber composition" or "compounded rubber" are used interchangeably to refer to "rubber which has been blended or mixed with various ingredients and materials" and such terms are well known to those having skill in the rubber mixing or rubber compounding art.

In the description of this invention, the term "phr" refers to parts of a respective material per 100 parts by weight of rubber, or elastomer.

The terms "cure" and "vulcanize" may be used interchangeably unless otherwise indicated.

The glass transition temperature (Tg) of an elastomer may be determined according to DIN 53445, "Torsion Pendulum Test, Testing of Polymer Materials" (1986), at a heating rate of 1° C. per minute unless otherwise indicated.

In a first aspect of the exemplary embodiment, a rubber composition includes 1) vulcanizable elastomers, 2) reinforcing fillers, 3) one or more processing aids, 4) optionally, one or more of antioxidants, antidegradants, and antiozonants, and 5) a cure package, which may include a sulfur-containing curing agent.

In a second aspect of the exemplary embodiment, a method of forming a cured rubber composition includes mixing 1) vulcanizable elastomers, 2) reinforcing fillers, 3) one or more processing aids, 4) optionally, one or more of antioxidants, antidegradants, and antiozonants, and 5) a sulfur-containing cure package and heating the resulting mixture to a suitable temperature to form the cured rubber composition.

In a third aspect of the exemplary embodiment, a tire includes a tread which includes the cured rubber composition.

1) Elastomers

One or more sulfur vulcanizable elastomers may be used in the rubber composition. These elastomers may include at least one double bond, e.g., a C═C bond, such as diene-based elastomers.

In one embodiment, the elastomers include a butadiene rubber (BR), a natural rubber (NR), and a styrene-butadiene rubber (SBR). The natural rubber may be the major component in the elastomers, e.g., more than the other elastomers combined.

In one embodiment, the BR, NR and SBR are the only elastomers used in the rubber composition.

By convention, the total amount of elastomer in the rubber composition is 100 phr.

a) Natural Rubber

Natural rubber (NR) is primarily cis-polyisoprene. The cis-1,4-polyisoprene content of the natural rubber may be at least 90 wt. %, or at least 95 wt. %. In one embodiment, the natural rubber is a natural cis-1,4-polyisoprene rubber having a cis-1,4-content of at least 96 percent and a Tg of about −65° C.

Several forms of natural rubber are commercially available. The natural rubber may meet the ISO TSR 20 Grade specification or the ISO TSR 10 Grade specification. An ISO TSR 20 natural rubber has a maximum ash content of 1 wt. %, as determined according to ISO 247:1990, a maximum volatile matter of 0.8 wt. %, as determined according to ISO 248:1991, a maximum nitrogen content of 0.6 wt. %, as determined according to ISO 1656:1996, a minimum initial Wallace plasticity of 30, as determined according to ISO 2007:1991, and a minimum plasticity retention index of 40, as determined according to ISO 2930:1995. For TSR 10, maximum ash of 0.75 wt. %, maximum nitrogen of 0.6 wt. %, maximum volatiles of 0.8 wt. %, minimum plasticity of 30, and minimum plasticity retention of 50.

The natural rubber may be used in the rubber composition in an amount of at least 50 phr, or at least 60 phr least 65 phr, or up to 85 phr, or up to 80 phr, or up to 75 phr, such as 70±2 phr.

b) Styrene-Butadiene Rubber (SBR)

The SBR may be an emulsion-polymerized styrene-butadiene rubber (ESBR) and/or a solution-polymerized styrene-butadiene rubber (SSBR).

In one embodiment, the SBR is an ESBR.

One example ESBR is sold under the tradename PLIOFLEX® 1502 by The Goodyear Tire & Rubber Company. It is an emulsion polymerized styrene-butadiene copolymer with a non-staining antioxidant system, has a bound styrene content of 23.5%, a Mooney viscosity (ML (1+4), at 100° C.) of 44 and a volatiles content of less than 0.5 wt. %. It contains a mixed acid emulsifier and is salt-acid coagulated. Other SBRs which can be used include PLIOFLEX® 1712C, PLIOFLEX® 1763, and PLIOFLEX® 1769, all from Goodyear.

The SBR may be used in the rubber composition in an amount of at least 10 phr, or at least 12 phr or up to 25 phr, or up to 20 phr, such as 15±2 phr.

c) The Butadiene Rubber

The butadiene rubber may be a synthetic polybutadiene which is the homopolymerization product of a single monomer: butadiene.

In one embodiment, a cis-1,4-polybutadiene rubber (BR or PBD) is used. Suitable polybutadiene rubbers may be prepared, for example, by organic solution polymerization of 1,3-butadiene. The BR may be conveniently characterized, for example, by having at least a 90 wt. % cis-1,4-microstructure content ("high cis" content), or at least 95 wt. %, or at least 96 wt. %. A glass transition temperature (Tg) of the BR may range of from −95 to −112° C. The BR may have a Mooney viscosity of 45-65. Suitable polybutadiene rubbers are available commercially, such as Budene® 1207, Budene® 1208, Budene® 1223, and Budene® 1280 from The Goodyear Tire & Rubber Company. These high cis-1,4-polybutadiene rubbers can for instance be synthesized utilizing nickel catalyst systems which include a mixture of (1) an organonickel compound, (2) an organoaluminum compound, and (3) a fluorine containing compound as described in U.S. Pat. Nos. 5,698,643 and 5,451,646. For example, cis-1,4-polybutadiene rubber obtained as Budene® 1207 from The Goodyear Tire & Rubber Company has a 1,4-content of at least 96 wt. % and a Tg of −100° C.

The BR may be used in the rubber composition in an amount of at least 10 phr, or at least 12 phr or up to 25 phr, or up to 20 phr, such as 15±2 phr.

d) Other Elastomers

Other vulcanizable elastomers may be present in minor amounts (e.g., totaling up to 10 wt. %, or up to 5 wt. %, or up to 2 wt. % of the elastomers), and may be selected from synthetic polyisoprene, halobutyl rubber, e.g., bromobutyl rubber and chlorobutyl rubber, nitrile rubber, liquid rubbers, polynorbornene copolymer, isoprene-isobutylene copolymer, ethylene-propylene-diene rubber, chloroprene rubber, acrylate rubber, fluorine rubber, silicone rubber, polysulfide rubber, epichlorohydrin rubber, styrene-isoprene-butadiene terpolymer, hydrated acrylonitrile butadiene rubber, isoprene-butadiene copolymer, butyl rubber, hydrogenated styrene-butadiene rubber, butadiene acrylonitrile rubber, a terpolymer formed from ethylene monomers, propylene monomers, and/or ethylene propylene diene monomer (EPDM), isoprene-based block copolymers, butadiene-based block copolymers, styrenic block copolymers, styrene-butadiene-styrene block copolymer (SBS), styrene-ethylene/butylene-styrene block copolymer (SEBS), styrene-[ethylene-(ethylene/propylene)]-styrene block copolymer (SEEPS), styrene-isoprene-styrene block copolymer (SIS), random styrenic copolymers, hydrogenated styrenic block copolymers, styrene butadiene copolymers, polyisobutylene, ethylene vinyl acetate (EVA) polymers, polyolefins, amorphous polyolefins, semi-crystalline polyolefins, alpha-polyolefins, reactor-ready polyolefins, acrylates, metallocene-catalyzed polyolefin polymers and elastomers, reactor-made thermoplastic polyolefin elastomers, olefin block copolymer, co-polyester block copolymer, polyurethane block copolymer, polyamide block copolymer, thermoplastic polyolefins, thermoplastic vulcanizates, ethylene vinyl acetate copolymer, ethylene n-butyl acrylate copolymer, ethylene methyl acrylate copolymer, neoprene, acrylics, urethane, poly(acrylate), ethylene acrylic acid copolymer, polyether ether ketone, polyamide, atactic polypropylene, polyethylene including atactic polypropylene, ethylene-propylene polymers, propylene-hexene polymers, ethylene-butene polymers, ethylene octene polymers, propylene-butene polymers, propylene-octene polymers, metallocene-catalyzed polypropylene polymers, metallocene-catalyzed polyethylene polymers, ethylene-propylene-butylene terpolymers, copolymers produced from propylene, ethylene, $C_4$-$C_{10}$ alpha-olefin monomers, polypropylene polymers, maleated polyolefins, polyester copolymers, copolyester polymers, ethylene acrylic acid copolymer, and/or polyvinyl acetate, and/or wherein the polymer optionally comprises a modification and/or functionalization selected from one or more of hydroxyl-, ethoxy-, epoxy-, siloxane-, amine-, aminesiloxane-, carboxy-, phthalocyanine-, and silane-sulfide-groups, at the polymer chain ends or pendant positions within the polymer.

2) Fillers

The rubber composition may include at least 45 phr or at least 50 phr or up to 70 phr, or up to 65 phr or up to 60 phr of reinforcing fillers.

In one embodiment, only two reinforcing fillers are used in the rubber composition, carbon black (CB) and silica, specifically a high surface area silica. In other embodiments, additional fillers may be employed.

A ratio by weight of carbon black to silica is at least 4:1, in particular, at least 5:1, or at least 6:1, e.g., up to 10:1, or up to 8:1, such as 7:1.

a) Silica

The term "silica" is used herein to refer to silicon dioxide, $SiO_2$ (which may contain minor amounts of impurities, generally less than 1 wt. %, resulting from the process in which the silica is formed). The silica may be a precipitated silica which formed by digesting amorphous silica with sodium hydroxide to form sodium silicate and precipitating silica from sodium silicate by reaction with an acidifying agent, such as sulfuric acid or carbon dioxide. The resulting precipitate is washed and filtered.

The exemplary silica is referred to as a high surface area silica. By this, it is meant that the silica has a CTAB specific surface area of at least 220 $m^2/g$, or at least 240 $m^2/g$. The high surface area silica may have a CTAB specific surface area of up to 500 $m^2/g$, or up to 400 $m^2/g$, or up to 300 $m^2/g$. CTAB surface area is measured according to ASTM D6845-20 "Standard Test Method for Silica, Precipitated, Hydrated-CTAB (Cetyltrimethylammonium Bromide) Surface Area." This test method covers the measurement of the specific surface area of precipitated silica, exclusive of area contained in micropores too small to admit hexadecyltrimethylammonium bromide (cetyltrimethylammonium bromide, commonly referred to as CTAB) molecules.

The high surface area silica may have a BET specific surface of at least 210 $m^2/g$, or up to 310 $m^2/g$. The BET specific surface is determined according to the Brunauer-Emmett-Teller method according to the standard ISO 5794-1:2022, Appendix D.

Exemplary precipitated high surface area silicas are available from Solvay e.g., as Zeosil™ Premium SW, which has a CTAB specific surface area of 250 $m^2/g$.

The high surface area silica may be present in the rubber composition in an amount of at least 4 phr, or at least 5 phr, or at least 6 phr, or up to 10 phr, or up to 8 phr. Put another way, the pretreated silica may be at least 1 wt. %, or at least 2 wt. %, or at least 3 wt. %, or up to 8 wt. %, or up to 6 wt. % of the rubber composition.

In some embodiments, the high surface area silica may be combined with another silica material, e.g., in a ratio by weight of high surface area silica material: other silica material(s) of from 80:20 to 95:5. When combined with another silica, the total amount of silica in the rubber composition may be up to 10 phr, or up to 8 phr.

In some embodiments, a coupling agent, such as a silane coupling agent, may be provided to covalently bond the silica to the elastomer. Examples of coupling agents and suitable amounts for them are provided in U.S. Pat. Nos. 5,094,829 A; 7,473,724 B2; 7,714,051B2; 8,329,805 B2; 9,074,073 B2; and 9,212,275 B2. In general, however, a coupling agent is not needed when the silica content is relatively low, as described herein.

b) Carbon Black

The carbon black may have a CTAB specific surface area of at least 100, or at least 102, or at least 104, or up to 120, or up to 118, or up to 116 $m^2/kg$.

Exemplary carbon blacks useful herein include ASTM designations N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991, as specified by ASTM D1765-21, "Standard Classification System for Carbon Blacks Used in Rubber Products." These carbon blacks have iodine absorptions ranging from 9 to 145 g/kg and DBP number ranging from 34 to 150 $cm^3/100$ g. For example, N220 grade is a granular carbon black with an Iodine Absorption of 116-126 g/kg, a CATB specific surface area of 106-116 $m^2/kg$, a DBP absorption of 109-119 $m^2/kg$, and an ash content of less than 0.5 wt. %.

The carbon black may be present in the rubber composition in an amount of at least 10 phr, or at least 20 phr, or at least 30 phr, or at least 40 phr, or up to 60 phr, or up to 55 phr. Put another way, the carbon black may be at least 4 wt. %, or at least 12 wt. %, or at least 20 wt. %, or at least 25 wt. %, or up to 40 wt. %, or up to 30 wt. % of the rubber composition.

c) Other Fillers

Reinforcing fillers, other than the silica and carbon black, may be utilized, e.g., in amounts of up to 30 phr, or up to 20 phr, or up to 10 phr, or up to 1 phr, or may be absent. Examples of such additional reinforcing fillers include alumina, aluminum hydroxide, clay (reinforcing grades), magnesium hydroxide, boron nitride, aluminum nitride, titanium dioxide, reinforcing zinc oxide, and combinations thereof.

In some embodiments, one or more non-reinforcing fillers may be used in the rubber composition. Examples of such fillers include clay (non-reinforcing grades), graphite, magnesium dioxide, starch, boron nitride (non-reinforcing grades), silicon nitride, aluminum nitride (non-reinforcing grades), calcium silicate, silicon carbide, ground rubber, and combinations thereof. The term "non-reinforcing filler" is used to refer to a particulate material that has a nitrogen absorption specific surface area (N2SA) of 20 $m^2/g$, or less, e.g., 10 $m^2/g$ or less. The N2SA surface area of a particulate material is determined according to ASTM D6556-21, "Standard Test Method for Carbon Black-Total and External Surface Area by Nitrogen Adsorption." In certain embodiments, non-reinforcing fillers may be particulate material that has a particle size of greater than 1000 nm.

A total amount of non-reinforcing filler may be 0 to 10 phr, or up to 5 phr, or up to 1 phr.

In one embodiment, components of the rubber composition other than the BR, SBR, natural rubber, carbon black, and high surface area silica (such as other elastomers, other reinforcing fillers, non-reinforcing fillers, processing aids, antioxidants, antiozonants, antidegradants, and the cure package) are present at no more than 40 phr of the rubber composition, or no more than 30 phr, or no more than 20 phr of the rubber composition.

3) Processing Aids

Processing aids may be used at a total of 3 to 20.0 phr, or up to 10 phr, and may include one or more of a resin, a wax, and a liquid plasticizer.

a) Resins

Example resins which may be used in the rubber composition include tackifying resins, such as unreactive phenol formaldehyde, and stiffness resins, such as reactive phenol formaldehyde resins and resorcinol or resorcinol and hexamethylene tetramine, which may be used at 1 to 10 phr, with a minimum tackifier resin, if used, being 1 phr and a minimum stiffener resin, if used, being 3 phr. Other resins include benzoxazine resins, as described in U.S. Pub. No. 20220195153 to Papakonstantopoulos, et al., which may be used at, e.g., from 2 phr to 10 phr.

Other suitable resins include hydrocarbon resins. Example hydrocarbon resins include aromatic, aliphatic, and cycloaliphatic resins.

In one embodiment, the hydrocarbon resin is present in the rubber composition in a total amount of at least 1 phr, or at least 3 phr, or up to 20 phr, or up to or up to 10 phr, or up to 6 phr.

The hydrocarbon resin may have a Tg of at least 30° C., or up to 50° C. Hydrocarbon resin Tg can be determined by DSC, according to the procedure discussed above for elastomer Tg measurements.

The hydrocarbon resin may have a softening point of at least 70° C., or up to 100° C. The softening point of a hydrocarbon resin is generally related to the Tg. The Tg is generally lower than its softening point, and the lower the Tg the lower the softening point.

Examples of aliphatic resins include C5 fraction homopolymer and copolymer resins. Examples of cycloaliphatic resins include cyclopentadiene ("CPD") homopolymer or copolymer resins, dicyclopentadiene ("DCPD") homopolymer or copolymer resins, and combinations thereof.

Examples of aromatic resins include aromatic homopolymer resins and aromatic copolymer resins. An aromatic copolymer resin refers to a hydrocarbon resin which comprises a combination of one or more aromatic monomers in combination with one or more other (non-aromatic) monomers, with the majority by weight of all monomers generally being aromatic.

Specific examples of aromatic resins include coumarone-indene resins, alkyl-phenol resins, and vinyl aromatic homopolymer or copolymer resins. Examples of alkyl-phenol resins include alkylphenol-acetylene resins such as p-tert-butylphenol-acetylene resins, alkylphenol-formaldehyde resins (such as those having a low degree of polymerization). Vinyl aromatic resins may include one or more of the following monomers: alpha-methylstyrene, styrene, ortho-methylstyrene, meta-methylstyrene, para-methylstyrene, vinyltoluene, para(tert-butyl)styrene, methoxystyrene, chlorostyrene, hydroxystyrene, vinylmesitylene, divinylbenzene, vinylnaphthalene and the like. Examples of vinylaromatic copolymer resins include vinylaromatic/terpene copolymer resins (e.g., limonene/styrene copolymer resins), vinylaromatic/C5 fraction resins (e.g., C5 fraction/styrene copolymer resin), vinylaromatic/aliphatic copolymer resins (e.g., CPD/styrene copolymer resin, and DCPD/styrene copolymer resin).

In the case of an aromatic resin based upon one or more of the above-mentioned vinyl aromatic monomers (e.g., styrene, alpha-methylstyrene), at least 80% by weight, or at least 85% by weight, or at least 90% by weight, or at least 95% by weight, or up to 100% by weight of the monomers in the aromatic resin may be aromatic monomers.

Other aromatic resins include terpene resins, such as alpha-pinene resins, beta-pinene resins, limonene resins (e.g., L-limonene, D-limonene, dipentene which is a racemic mixture of L- and D-isomers), beta-phellandrene, delta-3-carene, delta-2-carene, and combinations thereof.

In one embodiment, the hydrocarbon resin includes a combination of aromatic and aliphatic/cycloaliphatic hydrocarbons. In such cases, the total amount of any aliphatic and/or cycloaliphatic resin used in combination with the aromatic resin may be no more than 5 phr, or less than 4 phr, or less than 3 phr, or more than 20% by weight, or no more than 15% or no more than 10% by weight of the overall amount of hydrocarbon resins).

The aromatic resin may have a Mw of at least 1000 grams/mole and/or up to 4000 grams/mole.

A total amount of resin in the rubber composition may be at least 1 phr, or at least 3 phr, or up to 50 phr, or up to 20 phr, or up to 10 phr.

b) Waxes

Suitable waxes include paraffin waxes and microcrystalline waxes, which may be of the type described in The Vanderbilt Rubber Handbook (1978), pp. 346 and 347. Such waxes can serve as antiozonants.

The wax(es) may be present at 0.1 phr or more, such as at least 0.3 phr, or at least 0.5 phr, or up to 5 phr, or up to 2 phr, or up to 1 phr.

c) Liquid Plasticizers (Including Oils and Non-Oils)

The term liquid plasticizer is used to refer to plasticizer ingredients which are liquid at room temperature (i.e., liquid at 25° C. and above). Hydrocarbon resins, in contrast to liquid plasticizers, are generally solid at room temperature. Generally, liquid plasticizers will have a Tg that below 0° C., generally well below, such as less than −30° C., or less than −40° C., or less than −50° C., such as a Tg of 0° ° C. to −100° C.

Suitable liquid plasticizers include oils (e.g., petroleum oils as well as plant-sourced oils) and non-oil liquid plasticizers, such as ether plasticizers, ester plasticizers, phosphate plasticizers, and sulfonate plasticizers. Liquid plasticizer may be added during the compounding process or later, as an extender oil (which is used to extend a rubber). Petroleum based oils may include aromatic, naphthenic, low polycyclic aromatic (PCA) oils, and mixtures thereof. Plant oils may include oils harvested from vegetables, nuts, seeds, and mixtures thereof, such as triglycerides.

The Tg of the oil or oils used may be −40° C. to −100° C.

When present, the rubber composition may include at least 1 phr of liquid plasticizer, or up to 20 phr, or up to 10 phr, or up to 5 phr of liquid plasticizer. In one embodiment, no liquid plasticizer is employed.

In addition to one or more of the above processing aids, the rubber composition may include a peptizer, such as pentachlorothiophenol, dibenzamidodiphenyl disulfide, or a mixture thereof. Typical amounts of peptizer, if used, may be 0.1 phr to 1 phr.

4) Antioxidants and Antidegradants

Exemplary antioxidants suited to use in the rubber composition include amine based antioxidants, such as paraphenylenediamines (PPDs), e.g., N-(1,3-dimethylbutyl)-N'-phenyl-p-phenylenediamine (6PPD), para-phenylenediamine, and others, such as those disclosed in The Vanderbilt Rubber Handbook (1978), pages 344-346. Such antioxidants may also serve as antiozonants and may be used at from 0.1 to 5 phr, such as at least 0.3 phr, or at least 1 phr, or at least 2 phr. In some embodiments, at least a portion of the antioxidant is provided in the SBR.

Antidegradants, where used, may include amine based antidegradants and phenol-containing antidegradants, and may be used at from 1 to 5 phr. Phenol-containing antidegradants include polymeric hindered phenol antioxidants, and others, such as those included in The Vanderbilt Rubber Handbook (1978), pages 344-347.

5) Cure Package

The cure package includes a) a vulcanizing (cure) agent, b) optionally at least one of: a cure accelerator, a cure activator, and a cure inhibitor. The cure package may be used in the rubber composition at 0.5 to 20 phr, or at least 5 phr, or up to 10 phr.

a) Vulcanizing (Cure) Agent

The vulcanization of the rubber composition is conducted in the presence of a vulcanizing agent, such as a sulfur vulcanizing agent.

Examples of suitable sulfur vulcanizing agents include elemental sulfur (free sulfur), insoluble polymeric sulfur, soluble sulfur, and sulfur donating vulcanizing agents, for example, an amine disulfide, polymeric polysulfide, or sulfur olefin adduct, and mixtures thereof.

Sulfur vulcanizing agents may be used in an amount of from 0.1 to 10 phr, such as at least 0.4 phr, or up 5 phr, or up to 2 phr.

b) Cure Accelerators, Cure Activators, and Inhibitors

Cure accelerators and activators act as catalysts for the vulcanization agent. Accelerators are used to control the time and/or temperature required for vulcanization and to improve the properties of the vulcanizate. In one embodiment, a single accelerator system may be used, i.e., primary accelerator. A primary accelerator may be used in amounts ranging from 0.5 to 5 phr. In another embodiment, combinations of two or more accelerators may be used. In this embodiment, a primary accelerator is generally used in the larger amount (0.5 to 3 phr), and a secondary accelerator is generally used in smaller amounts (0.05 to 0.50 phr), in order to activate and to improve the properties of the vulcanizate. Combinations of such accelerators have historically been known to produce a synergistic effect of the final properties of sulfur-cured rubbers and are often somewhat better than those produced by use of either accelerator alone. In addition, delayed action accelerators may be used which are less affected by normal processing temperatures but produce satisfactory cures at ordinary vulcanization temperatures.

Representative examples of accelerators include amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound, although a second sulfenamide accelerator may be used.

Examples of thiazole cure accelerators include 2-mercaptobenzothiazole, 2,2'-dithiobis(benzothiazole) (MBTS). Guanidine cure accelerators include diphenyl guanidine (DPG). Examples of sulfenamide cure accelerators include benzothiazole sulfenamides, such as N-cyclohexyl-2-benzothiazolesulfenamide (CBS), and N-tert-butyl-2-benzothiazole-sulfenamide (TBBS).

Cure accelerators having a vulcanization initiation time, referred to as "to," of less than 3 minutes are referred to as ultra-accelerators. Example ultra-accelerators include 1,6-bis(N,N'-dibenzylthiocarbamoyldithio)hexane (BDBZTH), tetrabenzylthiuram disulfide (TBzTD), tetramethyl thiuram monosulfide (TMTM), tetramethyl thiuram disulfide (TMTD), tetraethyl thiuram disulfide (TETD), tetraisobutyl thiuram disulfide (TiBTD), dipentamethylene thiuram tetrasulfide (DPTT), zinc dibutyl dithiocarbamate (ZDBC), zinc diethyl dithiocarbamate, zinc dimethyl dithiocarbamate, copper dimethyl dithiocarbamate, tellurium diethyl dithiocarbamate (TDEC), zinc dibenzyl dithiocarbamate (ZBED), zinc diisononyl dithiocarbamate, zinc pentamethylene dithiocarbamate, zinc dibenzyldithiocarbamate (ZBEC), zinc isopropyl xanthate (ZIX), zinc butyl xanthate (ZBX), sodium ethyl xanthate (SEX), sodium isobutyl xanthate (SIBX), sodium isopropyl xanthate (SIPX), sodium n-butyl xanthate (SNBX), sodium amyl xanthate (SAX), potassium ethyl xanthate (PEX), potassium amyl xanthate (PAX), zinc 2-ethylhexylphosphorodithioate (ZDT/S), and mixtures thereof.

One ultra-accelerator which also provides the tire tread with improved abrasion resistance and a more stable cure is BDBZTH.

Suitably, combinations of an ultra-accelerator, such as BDBZTH, with one or more of a benzothiazole sulfenamide and a guanidine cure accelerator may be used.

The amount of the cure accelerator may be from 0.1 to 10 phr, or at least 0.5 phr, or at least 2 phr, or at least 5 phr, or up to 8 phr.

Cure activators are additives which are used to support vulcanization. Cure activators include both inorganic and organic cure activators. Zinc oxide is the most widely used inorganic cure activator and may be present at 1 phr to 10 phr, e.g., at least 2 phr, or up to 5 phr.

Organic cure activators include stearic acid, palmitic acid, lauric acid, zinc salts of each of the foregoing, and thiourea compounds, e.g., thiourea, and dihydrocarbylthioureas such as dialkylthioureas and diarylthioureas, and mixtures thereof. Specific thiourea compounds include N,N'-diphenylthiourea, trimethylthiourea, N,N'-diethylthiourea (DEU), N,N'-dimethylthiourea, N,N'-dibutylthiourea, ethylenethiourea, N,N'-diisopropylthiourea, N,N'-dicyclohexylthiourea, 1,3-di(o-tolyl) thiourea, 1,3-di(p-tolyl)thiourea, 1,1-diphenyl-2-thiourea, 2,5-dithiobiurea, guanylthiourea, 1-(1-naphthyl)-2-thiourea, 1-phenyl-2-thiourea, p-tolylthiourea, and o-tolylthiourea.

The total amount of organic cure activator(s) may be from 0.1 to 6 phr, such as at least 0.5 phr, or at least 1 phr, or up to 4 phr.

Cure inhibitors are used to control the vulcanization process and generally retard or inhibit vulcanization until the desired time and/or temperature is reached. Example cure inhibitors include cyclohexylthiophthalimide.

The amount of cure inhibitor, if used, may be 0.1 to 3 phr, or 0.5 to 2 phr.

By way of example, a rubber composition includes 100 phr of elastomers, comprising or consisting of a butadiene rubber, a natural rubber, and a styrene-butadiene rubber, a ratio by weight of natural rubber to styrene-butadiene rubber plus butadiene rubber being at least 50:50; 45-70 phr of a combination of carbon black and a high surface area silica, a ratio of the carbon black to the high surface area silica being at least 4:1, the high surface area silica having a CTAB surface area of at least 240 $m^2/g$; 3 to 20.0 phr of processing aids selected from the group consisting of a resin, a wax, and a liquid plasticizer; a total of 1-5 phr of at least one of an antioxidant, an antidegradant, and an antiozonant; and a total of 5-15 phr of a sulfur-containing cure package comprising a sulfur cure agent, one or more fatty acids, a sulfenamide, zinc oxide, and 1,6-bis(N,N-dibenzylthiocarbamoyldithio hexane.

Preparation of the Rubber Composition

Rubber compositions may be prepared by mixing the vulcanizable elastomers, the high surface area silica and carbon black, and other rubber compounding ingredients, not including the cure agent, in at least one sequential mixing stage with at least one mechanical mixer, usually referred to as "non-productive" mixing stage, or stage(s), to an elevated temperature under high shear rubber mixing conditions, followed by a final "productive" mixing stage, in which a sulfur-based cure package, such as a sulfur-based cure agent and cure accelerators, is added to the mixture and mixed at a lower mixing temperature to avoid unnecessarily pre-curing the rubber mixture during the mixing stage. The ingredients may be mixed in the non-productive mixing stage(s) for 2 minutes to a temperature of temperature of 130° ° C. to 200° C., e.g., about 145° C. Once the cure package is added, the subsequent productive mixing step may be conducted at a temperature below the vulcanization (cure) temperature in order to avoid unwanted pre-cure of the rubber composition, e.g., no more than 120° C., such as at least 40° C., or at least 60° C., e.g., for 2 minutes at a temperature of 110-115° C. Mixing may be performed, for example, by kneading the ingredients together in a Banbury mixer or on a milled roll. The rubber composition may be cooled to a temperature below 40° C. between each of the mixing stages. For example, the rubber composition may be dumped from the mixer after each mixing step, sheeted out from an open mill, and allowed to cool to below 40° C. after each mixing step.

When the cure package is thoroughly mixed, the temperature of the mixture may be raised to effect cure. Curing of the pneumatic tire or part thereof may be carried out at a temperature of from 120° C. to 200° C., e.g., at least 140° C., or up to 180° C., or about 150° C. Any of the usual vulcanization processes may be used, such as heating in a press or mold, or heating with superheated steam or hot air. Such tires can be built, shaped, molded and cured by various methods which are known and will be readily apparent to those having skill in such art.

The use of silica fillers may optionally necessitate a separate re-mill stage for separate addition of a portion or all of such filler. This stage often is performed at temperatures similar to, although often slightly lower than, those employed in the other productive mixing stages, e.g., ramping from 90° C. to 150° C.

In one embodiment, a tire is provided, the tire having a tread formed, at least in part, from the exemplary rubber composition. Other parts of the tire, such as the tire sidewalls, may additionally, or alternatively, be formed, at least in part, from a rubber composition as described herein. The tire may be a pneumatic tire for an on-the-road vehicle, such as an automobile or truck, or a tire for an off-road vehicle, airplane or the like. The tire tread may have a tread depth of at least 20 mm, e.g., at least 22 mm, such as up to 28 mm, or up to 27 mm, which is suitable for use in a truck.

The rubber composition is not limited to use in tires but may find application in rubber gloves, surgical instruments, and the like.

Example Compositions

Table 1 illustrates exemplary rubber compositions in accordance with aspects of the exemplary embodiment.

TABLE 1

Example Rubber Compositions

| Component | Example 1 (phr) | Example 2 (phr) |
|---|---|---|
| Synthetic Polybutadiene | 10-25 | 12-20 |
| Natural Rubber | 80-50 | 75-60 |
| Styrene-Butadiene elastomer | 10-25 | 12-20 |
| Carbon Black | 35-60 | 40-55 |
| High surface area silica | 4.0-15.0 | 5.0-10.0 |
| Resin | 2.0-8.0 | 3.0-5.0 |
| Wax (Paraffin wax and/or microcrystalline wax) | 0.3-1.0 | 0.4-0.8 |
| Liquid plasticizer, e.g., naphthenic oil | 0.0-8.0 | 1.0-5.0 |
| p-phenylenediamine, e.g., N-(1,3-dimethylbutyl)-N'-phenyl-p-phenylenediamine (6PPD) | 1.0-5.0 | 2.0-4.0 |
| Fatty acids, e.g., stearic acid (organic cure activator) | 1.0-4.0 | 1.5-3 |
| Sulfenamide cure accelerator, e.g., N-cyclohexyl-2-benzothiazolesulfenamide (CBS) | 0.5-1.5 | 0.7-1.2 |
| Zinc Oxide (inorganic cure activator) | 1.0-7.0 | 2.0-4.0 |
| Ultra-accelerator, e.g., 1,6-bis-N,N(dibenzylthiocarbamoyldithio)-hexane (BDBZTH) | 0.0-1.0 | 0.2-0.7 |
| Elemental Sulfur | 0.3-1.2 | 0.5-1.0 |

Tire Tread Properties

The use of the rubber composition in tires, such as tire treads, may result in a tire having improved or desirable tread properties. These improved or desirable properties may include tear resistance, elongation at break, and abrasion resistance.

Without intending to limit the scope of the exemplary embodiment, the following examples illustrate preparation of the exemplary rubber compositions and properties thereof.

EXAMPLES

A rubber composition A is prepared using the formulation shown in Table 2.

The rubber composition is mixed in three stages, the first two are non-productive and the third stage is a productive stage (in which the accelerators, other than zinc oxide, activators and sulfur are added). Table 2 shows the stage at which each component is added.

In the first stage, the composition is mixed until it reaches 160° C. In the second stage, it is mixed until the temperature reaches 145° C. In the productive stage, the rubber composition is mixed until it reaches 110° C. In the curing stage, the rubber composition is heated to a temperature of 150° C. for 32 minutes. During the non-productive mixing stages, the specific gravity and Mooney viscosity are checked to ensure all materials are according to specifications.

TABLE 2

| Rubber Composition A | | | |
|---|---|---|---|
| Component | phr | % by weight | Mixing Stage when added |
| ELASTOMERS | | | |
| Synthetic Polybutadiene[1] | 15.00 | 8.63 | 1 |
| Natural Rubber [2] | 70.00 | 40.26 | 1 |
| ESBR [3] | 15.00 | 8.63 | 1 |
| REINFORCING FILLERS | | | |
| Carbon Black [4] | 48.00 | 27.61 | 1 (40 phr), 2 (8 phr) |
| Silica [5] | 7.00 | 4.03 | 2 |
| PROCESSING AIDS | | | |
| Naphthenic Processing oil (Rubilene ™ 22 from Citgo) | 2.00 | 1.15 | 1 |
| Resin [6] | 4.00 | 2.30 | 1 |
| Paraffin Wax | 1.0 | 0.58 | 3 |
| ANTIOZONANT/ANTIOXIDANT | | | |
| N-(1,3-dimethylbutyl)-N'-phenyl-p-phenylenediamine (6PPD) | 2.75 | 1.58 | 2 |
| CURE PACKAGE | | | |
| Fatty acids, predominantly stearic acid [7] | 2.00 | 1.15 | 1 |
| N-cyclohexyl-2-benzothiazolesulfenamide (CBS) [8] | 0.95 | 0.55 | 3 |

TABLE 2-continued

| Rubber Composition A | | | |
|---|---|---|---|
| Component | phr | % by weight | Mixing Stage when added |
| Zinc Oxide [9] | 3.00 | 1.75 | 1 |
| 1,6-(bis-N,N-dibenzylthiocarbamoyldithio)hexane (BDBZTH) [10] | 0.50 | 0.29 | 3 |
| Sulfur [11] | 0.65 | 0.37 | 3 |
| Total | 173.85 | 100.00 | |

[1] Low molecular weight, branched neodymium catalyzed polybutadiene, BUD24PRO ™ from Goodyear.

[2] cis-1,4-polyisoprene rubber (ISO TSR 20 Grade) having a cis-1,4-content of at least 96 percent and a Tg of about −65 °C.

[3] Emulsified polymerized styrene butadiene copolymer (PLIOFLEX ® 1502), containing some antioxidant.

[4] ASTM D 1765 grade N220. Reinforcing filler.

[5] High surface area silica. CTAB surface area of about 250 $m^2$/g (Zeosil ® Premium SW from Solvay).

[6] Plasticizer.

[7] Organic cure activator.

[8] Accelerator and curing aid for sulfur.

[9] Inorganic cure activator.

[10] Ultra-accelerator.

[11] Cure agent.

A comparative rubber composition B is prepared with 80 phr natural rubber, 20 phr ESBR, 48 phr carbon black, 7 phr amorphous silica (125 $m^2$/gm BET nitrogen surface area), 4 phr resin, 0.95 phr N-cyclohexyl-2-benzothiazolesulfenamide accelerator, and 1.15 phr sulfur.

Properties of the Rubber Compositions

The following tests were performed on the rubber compositions.

Cure properties are determined with a Rubber Process Analyzer (RPA) according to the method described in ASTM D2084-19a, "Standard Test Method for Rubber Property—Vulcanization Using Oscillating Disk Cure Meter," using a Monsanto oscillating disc rheometer (MDR) which is operated at a temperature of 150° C. and at a frequency of 11 hertz. A description of oscillating disc rheometers can be found in the Vanderbilt Rubber Handbook edited by Robert O. Ohm (Norwalk, Conn., R. T. Vanderbilt Company, Inc., 1990), pages 554-557. The use of this cure meter and standardized values read from the curve are specified in ASTM D-2084. A typical cure curve obtained on an oscillating disc rheometer is shown on page 555 of the 1990 edition of the Vanderbilt Rubber Handbook.

In such an oscillating disc rheometer, compounded rubber samples are subjected to an oscillating shearing action of constant amplitude. The torque of the oscillating disc embedded in the stock that is being tested that is required to oscillate the rotor at the vulcanization temperature is measured. The values obtained using this cure test are very significant since changes in the rubber or the compounding recipe are very readily detected from changes in torque.

The storage modulus G' is determined with a Rubber Process Analyzer (RPA). In the present case, storage modulus values are measured on the uncured sample and after cure at 1% strain, 10% strain, and 50%. The measurement on the uncured sample is an indicator of its processability, while measurements on cured samples are indicative of the ride and handling of a tire using the rubber composition in the tread.

The T values are the minutes to the stated % of the torque increase. For example, T90 is the time in minutes to reach 90% of the Delta Torque. Delta Torque is the difference between maximum and minimum torque.

Rebound at 0° C. is measured on the cured sample as an indicator of the wet braking capability of the tire, with lower values generally being better.

Rolling Resistance is evaluated by % Rebound at 100° C. (higher is better) and Rubber Process Analyzer (RPA) Tan Delta (TD) at 10% RP.

Strebler Adhesion Steady State Average Load to itself 100° C. (N/mm). This is a peel test which determines interfacial adhesion by pulling one rubber composition away from the other at a right angle to the untorn test specimen with the two ends of the rubber compositions being pulled apart at a 180° angle to each other.

Tensile properties are measured with an Automated Testing System instrument by the Instron Corporation. Such instrument may determine ultimate tensile, ultimate elongation, modulii, etc. The tests include Instron tear 23° C. (average load/width) on unaged and aged samples; Ring Tensile, including 300% Modulus, Tensile, and Elongation (MPa).

Abrasion, indicative of tread wear, is determined as Grosch abrasion rate in terms of mg/km of rubber abraded away. The test rubber sample is placed at a slip angle under constant load (Newtons) as it traverses a given distance on a rotating abrasive disk. The Grosch result is an average of four runs of the same sample at 40N load at 6-degree angle.

Properties of the rubber composition are evaluated against a control sample in Table 3.

TABLE 3

| Properties | | |
|---|---|---|
| Test | Rubber Composition A | Rubber Composition B |
| Pre-cure Storage Modulus G' at 0.833 Hz | 0.206 | 0.189 |
| Storage Modulus G' at 1% strain (kPa) | 2.047 | 1.919 |
| Storage Modulus G' at 10% strain (kPa) | 1.068 | 1.071 |
| Storage Modulus G' at 50% strain (kPa) | 0.694 | 0.731 |
| Wet Braking, Rebound 0 °C | 28.2 | 25.2 |
| Roll Resistance, Rebound 100 °C | 50.1 | 52.3 |
| Rubber Process Analyzer TD 10% | 0.192 | 0.175 |
| Strebler Adhesion Steady State Average Load to itself 100 °C (N/mm) | 52.5 | 43.7 |
| Strebler Adhesion Steady State Average Load to itself 100 °C-Aged 7 days at 70 °C (N/mm) | 51.1 | 41.2 |
| Instron tear 23 °C (average load/width) | 85.1 | 82.2 |
| Instron tear 23 °C-Aged 7 days at 70 °C (Average load/width) | 84.1 | 75.9 |
| 300% Modulus (RT Ring) | 6.6 | 7.6 |
| Tensile (RT Ring) | 18.6 | 19.4 |
| Elongation (RT Ring) (MPa) | 669 | 627 |
| Grosch Abrasion Test (mg/km) | 43 | 57.94 |
| CURE PROPERTIES | | |
| Delta Torque MDR 150 °C | 11.1 | 10.9 |
| Torque T25 MDR 150 °C (dNm) | 9.1 | 7.1 |
| Torque T90 MDR 150 °C (dNm) | 23.4 | 18.8 |

As can be seen in Table 3, Rubber Composition A has several comparable or improved properties, including improved Grosch value, when compared with Comparative Example B.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word “about.” Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A rubber composition comprising:

100 phr of elastomers, including at least 50 phr natural rubber, at least 10 phr of butadiene rubber and at least 10 phr styrene-butadiene rubber;

at least 45 phr of reinforcing fillers, including carbon black and a high surface area silica, a ratio of the carbon black to the high surface area silica being at least 4:1, the high surface area silica having a CTAB surface area of at least 220 $m^2/g$;

one or more processing aids; and a sulfur-containing cure package including a vulcanizing agent and an ultra-accelerator.

2. The rubber composition of claim 1, wherein the cure package further comprises a benzothiazole sulfenamide.

3. The rubber composition of claim 1, wherein the high surface area silica has a surface area of at least 240 $m^2/g$.

4. The rubber composition of claim 1, wherein the high surface area silica has a surface area of no more than 400 $m^2/g$.

5. The rubber composition of claim 1, wherein the rubber composition includes at least 50 phr of the reinforcing fillers.

6. The rubber composition of claim 1, wherein the rubber composition includes no more than 70 phr of the reinforcing fillers.

7. The rubber composition of claim 1, wherein reinforcing fillers, other than the carbon black and the high surface area silica, are present at no more than 10 phr.

8. The rubber composition of claim 1, wherein the at least one processing aid includes at least one of a resin, a wax, and a liquid plasticizer.

9. The rubber composition of claim 1, wherein the ultra-accelerator comprises 1,6-bis(N,N-dibenzylthiocarbamoyl-dithio)hexane.

10. The rubber composition of claim 1, wherein the ultra-accelerator is at least 2 phr.

11. The rubber composition of claim 1, further comprising at least one of an antioxidant and an antidegradant.

12. The rubber composition of claim 1, wherein the rubber composition includes no more than 30 phr of components other than the elastomers, the carbon black, and the high surface area silica.

13. A tire tread formed from the rubber composition of claim 1.

14. The tire tread of claim 13, wherein the tire tread has a tread depth of 22 to 28 mm.

15. A method of forming a cured rubber composition comprising:

mixing together:

100 phr of elastomers, including at least 50 phr natural rubber, at least 10 phr of butadiene rubber and at least 10 phr styrene-butadiene rubber, at least 45 phr of reinforcing fillers, including carbon black and a high surface area silica, a ratio of the carbon black to the high surface area silica being at least 4:1, the high surface area silica having a CTAB surface area of at least 220 $m^2/g$, one or more processing aids, and a sulfur-containing cure package including a vulcanizing agent and an ultra-accelerator, to form a mixture; and curing the mixture to form the cured rubber composition.

16. The method of claim 15, wherein the mixture further comprises at least one of an antioxidant and an antidegradant.

17. The method of claim 15, wherein the curing comprises heating the mixture to a temperature of at least 120° C.

18. The method of claim 15, wherein the curing includes forming a tire tread comprising the cured rubber composition.

19. A rubber composition comprising:

100 phr of elastomers, comprising a natural rubber, a butadiene rubber, and a styrene-butadiene rubber;

45-70 phr of a combination of carbon black and a high surface area silica, a ratio of the carbon black to the high surface area silica being at least 4:1, the high surface area silica having a CTAB surface area of at least 240 $m^2/g$;

3.0 to 20.0 phr of processing aids selected from the group consisting of a resin, a wax, a liquid plasticizer, and mixtures thereof;

a total of 1-5 phr of at least one of an antioxidant and an antidegradant; and a total of 5-15 phr of a sulfur-containing cure package comprising a sulfur cure agent, one or more fatty acids, a benzothiazole sulfenamide, zinc oxide, and 1,6-bis-(N, N-dibenzylthiocarbamoyldithio)hexane.

* * * * *